United States Patent
Denda

(10) Patent No.: US 9,580,607 B2
(45) Date of Patent: *Feb. 28, 2017

(54) AQUEOUS BASE METAL PIGMENT DISPERSION LIQUID AND AQUEOUS INK COMPOSITION

(71) Applicant: Seiko Epson Corporation, Tokyo (JP)

(72) Inventor: Atsushi Denda, Chino (JP)

(73) Assignee: Seiko Epson Corporation (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/589,321

(22) Filed: Jan. 5, 2015

(65) Prior Publication Data

US 2015/0191602 A1 Jul. 9, 2015

(30) Foreign Application Priority Data

Jan. 6, 2014 (JP) ................................. 2014-000219

(51) Int. Cl.
| | |
|---|---|
| C09C 3/08 | (2006.01) |
| C09D 17/00 | (2006.01) |
| C09C 1/40 | (2006.01) |
| C09D 11/322 | (2014.01) |

(52) U.S. Cl.
CPC . C09C 3/08 (2013.01); C09C 1/40 (2013.01); C09D 11/322 (2013.01); C09D 17/006 (2013.01); *C01P 2004/20* (2013.01); *C01P 2006/40* (2013.01)

(58) Field of Classification Search
CPC ....... C09D 11/322; C09D 17/006; C09C 1/40; C09C 3/08; C01P 2006/20; C01P 2006/40
See application file for complete search history.

(56) References Cited

U.S. PATENT DOCUMENTS

| | | | |
|---|---|---|---|
| 5,637,143 A | 6/1997 | Jenkins et al. | |
| 6,281,277 B1 * | 8/2001 | Ishii | B82Y 30/00 423/111 |
| 2003/0029355 A1 * | 2/2003 | Miyabayashi | C09D 11/40 106/31.27 |
| 2007/0028807 A1 | 2/2007 | Wallquist et al. | |
| 2008/0081864 A1 | 4/2008 | Takano | |
| 2008/0250970 A1 | 10/2008 | Oyanagi et al. | |
| 2008/0314284 A1 | 12/2008 | Li et al. | |
| 2010/0326323 A1 | 12/2010 | Abe et al. | |
| 2011/0008613 A1 | 1/2011 | Takano et al. | |
| 2011/0110992 A1 | 5/2011 | Garrison et al. | |
| 2015/0112003 A1 | 4/2015 | Toyoda et al. | |

FOREIGN PATENT DOCUMENTS

| | | |
|---|---|---|
| JP | 2759198 B2 | 5/1998 |
| JP | 2003213157 A * | 7/2003 |
| JP | 2006-169393 A | 6/2006 |
| JP | 2006-199920 A | 8/2006 |
| JP | 3869503 B2 | 1/2007 |
| JP | 2008-174712 A | 7/2008 |
| JP | 2009-215411 A | 9/2009 |
| JP | 4358897 B1 | 11/2009 |
| JP | 2012-251070 A | 12/2012 |
| JP | 2013-122008 A | 6/2013 |
| WO | WO-95-04783 A1 | 2/1995 |
| WO | WO-2006-066825 A2 | 6/2006 |

OTHER PUBLICATIONS

Machine translation of JP 2003-213157.*

* cited by examiner

*Primary Examiner* — Veronica F Faison
(74) *Attorney, Agent, or Firm* — Harness, Dickey & Pierce, P.L.C.

(57) ABSTRACT

Disclosed herein is an aqueous base metal pigment dispersion liquid, including: a base metal pigment surface-treated with a fluorine-based compound; and water as a part of a solvent, in which the aqueous base metal pigment dispersion liquid further includes one or more solvents having a specific dielectric constant of greater than or equal to 30 and less than or equal to 50 and one or more solvents having a specific dielectric constant of less than 30, as measured by an alternate current-type dielectric constant measurement device at a temperature of 23° C. and a frequency of 10 kHz, as the solvent, as the solvent, and in which the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %, when the total amount of the solvents is 100 mass %.

11 Claims, No Drawings

AQUEOUS BASE METAL PIGMENT DISPERSION LIQUID AND AQUEOUS INK COMPOSITION

BACKGROUND

1. Technical Field

The present invention relates to an aqueous base metal pigment dispersion liquid and an aqueous ink composition.

2. Related Art

In the related art, as methods of forming a coating film having metallic luster on a printed matter, a foil press printing method using a printing ink or metal foil, in which gold powder or silver powder made of brass, aluminum microparticles or the like is used in a pigment, a thermal transfer printing method using a metal foil, and the like have been used. However, these methods are problematic in that it is difficult to form a fine pattern or to apply these methods to a curved surface. Particularly, the foil press printing method is problematic in that on-demand properties are low, the application thereof to multi-product production is difficult, and the printing of a gradational metal tone is impossible.

Recently, a large number of application examples of an ink jet head in printing have been found. One of the application examples is metallic printing, and thus the development of an ink having metallic luster has been conducted. An ink jet method is advantageous in that it can be suitably applied to the formation of a fine pattern or the recording onto a curved surface. For example, JP-A-2008-174712 discloses an aluminum pigment dispersion liquid based on an organic solvent such as alkylene glycol, and a non-aqueous ink composition containing the same.

Meanwhile, in terms of global environment and human safety, there is a tendency that the development of an aqueous ink composition instead of a non-aqueous ink composition based on an organic solvent is desired. However, when an aluminum pigment, as a kind of base metal pigment, is dispersed in water, alumina is formed together with the generation of hydrogen gas by the reaction with water to cause a whitening phenomenon. For this reason, the aluminum pigment loses metallic luster.

In order to solve the above problems, for example, Japanese Patent No. 4358897 discloses a surface-coated aluminum pigment in which water resistance is provided by surface-treating an aluminum pigment with alkoxysilane. Japanese Patent No. 3869503 discloses a composition containing aluminum powder, inorganic phosphoric acid (salt), phosphate ester, and water. Japanese Patent No. 2759198 discloses an aqueous paint composition containing aluminum coated with a hetero-polyanion compound. JP-A-2006-199920 discloses an aluminum pigment, which is prepared by treating aluminum with a phosphate compound or a borate compound and then coating the treated aluminum with a layer containing hydrated tin oxide or the like.

However, the aluminum pigment disclosed in each of the above Japanese Patent No. 4358897, Japanese Patent No. 3869503, Japanese Patent No. 2759198, and JP-A-2006-199920 is problematic in that water resistance is insufficient, and in that surface state is changed by the oxidation proceeding over time in an aqueous medium, and thus dispersion stability deteriorates. In addition, when the surface of aluminum is coated, there is a problem in that the oxidation of aluminum proceeds during the surface coating, and thus agglomeration easily occurs together with the deterioration of luster. Like this, the study for improving the dispersion stability of an aluminum pigment in an aqueous medium by imparting water resistance to the aluminum pigment has almost been considered in terms of surface treatment of the aluminum pigment.

SUMMARY

An advantage of some aspects of the invention is to provide an aqueous base metal pigment dispersion liquid and an aqueous ink composition, each of which has excellent water resistance and dispersibility in an aqueous medium.

The invention can be realized in the following forms or application examples.

APPLICATION EXAMPLE 1

According to an aspect of the invention, there is provided an aqueous base metal pigment dispersion liquid, including: a base metal pigment surface-treated with a fluorine-based compound; and water as a part of a solvent, in which the aqueous base metal pigment dispersion liquid further includes one or more solvents having a specific dielectric constant of greater than or equal to 30 and less than or equal to 50 and one or more solvents having a specific dielectric constant of less than 30, as measured by an alternate current-type dielectric constant measurement device at a temperature of 23° C. and a frequency of 10 kHz, as the solvent, and in which the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %, when the total amount of the solvents is 100 mass %.

According to the aqueous base metal pigment dispersion liquid of Application Example 1, an aqueous medium mixed with solvents having a predetermined specific dielectric constant is used as a dispersion medium, and thereby the water resistance and dispersibility of the base metal pigment surface-treated with the fluorine-based compound become better.

APPLICATION EXAMPLE 2

In the aqueous base metal pigment dispersion liquid of Application Example 1, a solvent, from which the base metal pigment was removed by centrifugal separation, may have a specific dielectric constant of greater than or equal to 45 and less than or equal to 60, as measured by an alternate current-type dielectric constant measurement device at a temperature of 23° C. and a frequency of 10 kHz.

According to the aqueous base metal pigment dispersion liquid of Application Example 2, an aqueous medium having a predetermined specific dielectric constant is used as a dispersion medium, and thereby the water resistance and dispersibility of the base metal pigment surface-treated with the fluorine-based compound become better.

APPLICATION EXAMPLE 3

In the aqueous base metal pigment dispersion liquid of Application Example 1 or Application Example 2, the base metal pigment may have a scale-like shape.

According to the aqueous base metal pigment dispersion liquid of Application Example 3, the base metal pigment can exhibit its own metallic luster more effectively.

APPLICATION EXAMPLE 4

In the aqueous base metal pigment dispersion liquid of any one of Application Examples 1 to 3, the fluorine-based compound may have a perfluoroalkyl group.

APPLICATION EXAMPLE 5

In the aqueous base metal pigment dispersion liquid of Application Example 4, the perfluoroalkyl group may have a carbon number of 1 to 6.

According to the aqueous base metal pigment dispersion liquid of Application Example 4 or Application Example 5, the fluorine-based compound has such a structure, thereby further improving the water resistance and dispersibility of the base metal pigment.

APPLICATION EXAMPLE 6

According to another aspect of the invention, there is provided an aqueous ink composition, including: a base metal pigment surface-treated with a fluorine-based compound; and water as a part of a solvent, in which the aqueous ink composition further includes one or more solvents having a specific dielectric constant of greater than or equal to 30 and less than or equal to 50 and one or more solvents having a specific dielectric constant of less than 30, as measured by an alternate current-type dielectric constant measurement device at a temperature of 23° C. and a frequency of 10 kHz, as the solvent, and in which the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %, when the total amount of the solvents is 100 mass %.

According to the aqueous ink composition of Application Example 6, an aqueous medium mixed with solvents having a predetermined specific dielectric constant is used, and thereby the water resistance and dispersibility of the base metal pigment surface-treated with the fluorine-based compound become better.

APPLICATION EXAMPLE 7

In the aqueous ink composition of Application Example 6, a solvent, from which the base metal pigment was removed by centrifugal separation, may have a specific dielectric constant of greater than or equal to 45 and less than or equal to 60, as measured by an alternate current-type dielectric constant measurement device at a temperature of 23° C. and a frequency of 10 kHz.

According to the aqueous ink composition of Application Example 7, an aqueous medium having a predetermined specific dielectric constant is used, and thereby the water resistance and dispersibility of the base metal pigment surface-treated with the fluorine-based compound become better.

APPLICATION EXAMPLE 8

In the aqueous ink composition of Application Example 6 or Application Example 7, the base metal pigment may have a scale-like shape.

According to the aqueous ink composition of Application Example 8, the base metal pigment can exhibit its own metallic luster more effectively.

APPLICATION EXAMPLE 9

In the aqueous ink composition of any one of Application Examples 6 to 8, the fluorine-based compound may have a perfluoroalkyl group.

APPLICATION EXAMPLE 10

In the aqueous ink composition of Application Example 9, the perfluoroalkyl group may have a carbon number of 1 to 6.

According to the aqueous ink composition of Application Example 9 or Application Example 10, the fluorine-based compound has such a structure, thereby further improving the water resistance and dispersibility of the base metal pigment.

APPLICATION EXAMPLE 11

In the aqueous ink composition according to any one of Application Examples 6 to 10, the aqueous ink composition may not substantially contain a polymerizable compound.

DESCRIPTION OF EXEMPLARY EMBODIMENTS

Hereinafter, a preferable embodiment of the invention will be described. The following embodiment describes an example of the invention. The invention is not limited to the following embodiments. Various modifications can be made within the scope not departing from the gist thereof.

Hereinafter, an aqueous base metal pigment dispersion liquid and an aqueous ink composition will be described in this order.

1. AQUEOUS BASE METAL PIGMENT DISPERSION LIQUID

The aqueous base metal pigment dispersion liquid according to the present embodiment includes: a base metal pigment surface-treated with a fluorine-based compound; and water as a part of a solvent, in which the aqueous base metal pigment dispersion liquid further includes one or more solvents having a specific dielectric constant of greater than or equal to 30 and less than or equal to 50 and one or more solvents having a specific dielectric constant of less than 30, as measured by an alternate current-type dielectric constant measurement device at a temperature of 23° C. and a frequency of 10 kHz, as the solvent, and in which the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %, when the total amount of the solvents is 100 mass %.

In the invention, the term "base metal" is referred to as a metal having a greater ionization tendency than hydrogen. Examples of the base metal include alkali metals, alkaline-earth metals, single metals such as Al, Fe, Zn, Pb, Cu, Ni, Co, and Cr, and alloys thereof.

In the base metal pigment contained in the aqueous base metal pigment dispersion liquid according to the present embodiment, pigment particles made of a base metal-containing material (hereinafter, the pigment particle made of a base metal-containing material before surface treatment is referred to as "mother particle") are surface-treated with a fluorine-based compound. That is, the base metal pigment contained in the aqueous base metal pigment dispersion liquid according to the present embodiment has a structure in which the surface of pigment particles (mother particles) made of a base metal-containing material is coated with a monolayer or multilayer containing a fluorine-based compound.

1.1. Mother Particle

First, the pigment particle (mother particle) made of a base metal-containing material is described. The mother particles may be partially (a region including at least a surface periphery) made of a base metal, or may also be entirely made of a base metal. Further, the mother particle may include a base made of a non-metallic material and a base metal-made coating layer covering the base.

The base metal constituting the mother particle is not limited as long as it fits the definition of the above-mentioned base metal, but, in terms of securement of metallic luster and in terms of cost, base metals including at least one of Al, Fe, Cu, Ni, and Cr, or alloys of these base metals and other metals are preferable, and Al or an Al alloy is more preferable. When Al or an Al alloy is dispersed in an aqueous medium, hydrogen gas is generated by a reaction with water, and simultaneously $Al(OH)_3$ or $Al_2O_3$ is formed, thereby causing a whitening phenomenon. Due to this reaction, there is a problem that Al or an AL alloy loses metallic luster. In the invention, a base metal pigment coated with a monolayer or multilayer containing a fluorine-based compound is used, thereby providing water resistance, so as to prevent the occurrence of the above problem.

Further, the mother particle may be formed by any method. However, for example, preferably, the mother particle is a scale-like particle obtained by forming a base metal film on one side of a sheet-like substrate using an evaporation method, stripping the base metal film from the sheet-like substrate and then pulverizing the stripped base metal film. Instead of the evaporation method, ion plating or sputtering may be used. According to this method, a scale-like mother particle having small film thickness variation and high surface flatness can be obtained, and thus the mother particle obtained in this way can exhibit its own metallic luster more effectively.

As the sheet-like substrate, for example, a plastic film, such as polyethylene terephthalate, may be used. Further, on the film forming surface of the sheet-like substrate, a stripping agent for improving strippability, such as silicone oil, may be applied previously, and a resin layer for stripping may also be formed previously. Examples of resins used in the resin layer for stripping include polyvinyl alcohol, polyvinyl butyral, polyethylene glycol, polyacrylic acid, polyacrylamide, cellulose acetate butyrate as a cellulose derivative, and a modified nylon resin. The stripping and pulverization of the base metal film may be performed by irradiating the film with ultrasonic waves in a non-aqueous medium or by applying external force to the film with the stirring using a homogenizer.

When the stripping and pulverization of the base metal film may be performed in this way, preferable examples of the non-aqueous medium used herein may include alcohols, such as methanol, ethanol, propanol, and butanol; hydrocarbon compounds, such as n-heptane, n-octane, decane, dodecane, tetradecane, toluene, xylene, cymene, durene, indene, dipentene, tetrahydronaphthalene, decahydronaphthalene, and cyclohexylbenzene; ether compounds, such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis(2-methoxyethyl) ether, and p-dioxane; and polar organic solvents, such as propylene carbonate, γ-butyrolactone, N-methyl-2-pyrrolidone, N,N-dimethylformamide, N,N-dimethylacetamide, dimethyl sulfoxide, cyclohexanone, and acetonitrile. When this non-aqueous medium is used, the variations in size, shape, and characteristics among particles can be reduced, while preventing the involuntary oxidation of the mother particles.

Meanwhile, the preferable average particle diameter and average thickness of the mother particles are approximately equal to the average particle diameter and average thickness of the following base metal pigment, and therefore, a description thereof will be omitted.

1.2. Fluorine-Based Compound

Subsequently, a fluorine-based compound used in the surface treatment of mother particles is described. As described above, the base metal pigment contained in the aqueous base metal pigment dispersion liquid according to the present embodiment is a base metal pigment in which the mother particles are surface-treated with the fluorine-based compound. As the fluorine-based compound, fluorine-based phosphonic acid, fluorine-based carboxylic acid, fluorine-based sulfonic acid, and salts thereof may be preferably used. When these fluorine-based compounds are used, a phosphate group, a carboxyl group, or a sulfonate group is bonded to the surface of the mother particles to form a coated film, thus obtaining a base metal pigment having water resistance. Therefore, it is possible to effectively prevent the base metal pigment from reacting with water in an aqueous medium. Further, an aqueous base metal pigment dispersion liquid excellent in dispersibility can be obtained. Among these, since the bonding ability of the phosphate group to the surface of the mother particle is very excellent, fluorine-based phosphonic acid and a salt thereof are more preferable.

Preferably, the fluorine-based phosphonic acid and salt thereof have a structure represented by the following General Formula (1).

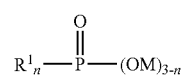

In the Formula (1) above, $R^2$ is each independently one group selected from the following structural formulae, and M is each independently a hydrogen atom, a monovalent metal ion, an ammonium ion, or $-NR^2R^3R^4$. $R^2$, $R^3$, and $R^4$ are each independently a hydrogen atom or a $C_2H_4OH$ group, except that all of them are hydrogen atoms. n is an integer of greater than or equal to 1 and less than or equal to 3, m is an integer of greater than or equal to 1 and less than or equal to 12, and l is an integer of greater than or equal to 1 and less than or equal to 12.

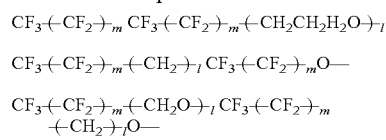

In the Formula (1) above, m is an integer of greater than or equal to 1 and less than or equal to 12, but preferably greater than or equal to 1 and less than or equal to 8, and more preferably greater than or equal to 1 and less than or equal to 5. Further, l is an integer of greater than or equal to 1 and less than or equal to 12, but preferably greater than or equal to 1 and less than or equal to 10, and more preferably greater than or equal 1 and less than or equal to 6. When m and l are respectively within the above preferable ranges, the above-mentioned effects are remarkably exhibited.

Preferably, the fluorine-based phosphonic acid is a compound represented by the following General Formula (2) in terms of being excellent in the balance between absorption capacity onto the surface of the mother particle and the improvement of water resistance.

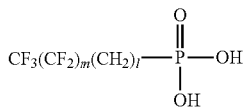
(2)

In the Formula (2) above, m is an integer of greater than or equal to 1 and less than or equal to 12, but preferably greater than or equal to 1 and less than or equal to 8, and more preferably greater than or equal to 1 and less than or equal to 5. Further, l is an integer of greater than or equal to 1 and less than or equal to 12, but preferably greater than or equal to 1 and less than or equal to 10, and more preferably greater than or equal to 1 and less than or equal to 6. When m and l are respectively within the above preferable ranges, the above-mentioned effects are remarkably exhibited.

Preferably, the fluorine-based carboxylic acid and salt thereof have a structure represented by the following General Formula (3).

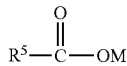
(3)

In the Formula (3) above, $R^5$ is one group selected from the following structural formulae, and M is a hydrogen atom, a monovalent metal ion, or ammonium ion. m is an integer of greater than or equal to 1 and less than or equal to 12, but preferably greater than or equal to 1 and less than or equal to 8, and more preferably greater than or equal to 1 and less than or equal to 5. Further, l is an integer of greater than or equal to 1 and less than or equal to 12, but preferably greater than or equal to 1 and less than or equal to 10, and more preferably greater than or equal to 1 and less than or equal to 6.

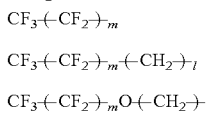

Preferably, the fluorine-based sulfonic acid and salt thereof have a structure represented by the following General Formula (4).

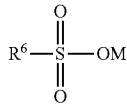
(4)

In the Formula (4) above, $R^6$ is one group selected from the following structural formulae, and M is a hydrogen atom, a monovalent metal ion, or ammonium ion. m is an integer of greater than or equal to 5 and less than or equal to 17, and l is an integer of greater than or equal to 1 and less than or equal to 12.

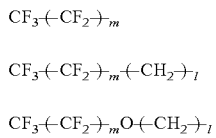

In addition, preferably, the fluorine-based compound has a perfluoroalkyl group ($C_nF_{2+1}$—) on at least part of the structure thereof, and more preferably, the perfluoroalkyl group has a carbon number of 1 to 6. When the fluorine-based compound has such a structure, a base metal pigment having further improved water resistance and excellent metallic luster and dispersibility can be easily obtained.

Moreover, it is preferable that the molecular weight of the fluorine-based compound be less than or equal to 1000. When the fluorine-based compound adsorbed on the surface of the mother particles is a fluorine-based polymer disclosed in JP-A-2003-213157, JP-A-2006-169393, or JP-A-2009-215411, a coated film becomes excessively thick, so that metallic luster deteriorates, and the interaction between base metal pigments particles provided with the coated film becomes strong, thereby remarkably deteriorating dispersibility in some cases. For this reason, it is preferable that the film formed on the surface of the mother particles be a monomolecular film made of the fluorine-based compound having a molecular weight of less than or equal to 1000.

1.1.3. Aqueous Medium

The aqueous base metal pigment dispersion liquid according to the present embodiment includes water, one or more solvents having a specific dielectric constant of greater than or equal to 30 and less than or equal to 50, and one or more solvents having a specific dielectric constant of less than 30, as measured by an alternate current-type dielectric constant measurement device at a temperature of 23° C. and a frequency of 10 kHz. Here, when the total amount of the solvents is 100 mass %, the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %. The base metal pigment is dispersed in this aqueous medium including these solvents.

In the invention, the specific dielectric constant of the solvent may be measured at 23° C. by a parallel-plate capacitor method using an alternate current-type dielectric constant measurement device. Specifically, under an environment of 23° C., the solvent, as a sample, is pinched between two parallelly-arranged electrode plates (gap between electrode plates: 0.5 mm) to form a capacitor. Subsequently, an alternate current of 1 V is applied to the capacitor at a frequency of 10 kHz to 100 kHz, and the specific dielectric constant thereof is measured. In this case, the specific dielectric constant measured when the alternate current was applied at a frequency of 10 kHz is set as "specific dielectric constant of solvent" in the invention.

Examples of the solvent having a specific dielectric constant of greater than or equal to 30 and less than or equal to 50 include glycerin (46.7), propylene glycol (36.1), and methyl alcohol (32.6). Examples of the solvent having a specific dielectric constant of less than 30 include alcohols, such as ethyl alcohol (24.3), n-propyl alcohol (20.1) and the like; ketones, such as acetone (20.7) and the like; polyhydric alcohols, such as hexylene glycol (23.7), 1,2-hexanediol (13.8), triethylene glycol (24.89) and the like; glycol ethers, such as diethylene glycol diethyl ether (5.4) and the like; and lactams, such as 2-pyrrolidone (26.4) and the like. Meanwhile, the specific dielectric constant of water is 74. 1. The numbers in the parentheses represent specific dielectric constants. Further, hexylene glycol corresponds to a preferable solvent because it exhibits high water resistance and dispersibility even in the presence of a small amount of surfactant.

When the total amount of the solvents used in the aqueous base metal pigment dispersion liquid according to the present embodiment is 100 mass %, the sum of solvents having a specific dielectric constant of greater than or equal to 30 and less than or equal to 50 is more than or equal to 5 mass % and less than or equal to 50 mass %, preferably more than or equal to 10 mass % and less than or equal to 45 mass %, more preferably more than or equal to 15 mass % and less than or equal to 40 mass %, and particularly preferably more than or equal to 20 mass % and less than or equal to 35 mass %, from the viewpoint of balance between good water resistance and dispersibility of the base metal pigment. If the sum of solvents having a specific dielectric constant of greater than or equal to 30 and less than or equal to 50 is less than the above range, the dispersibility of the base metal pigment easily deteriorates, and if the sum of solvents having a specific dielectric constant of greater than or equal to 30 and less than or equal to 50 exceeds the above range, the water resistance of the base metal pigment easily deteriorates.

When the total amount of the solvents used in the aqueous base metal pigment dispersion liquid according to the present embodiment is 100 mass %, the sum of solvents having a specific dielectric constant of less than 30 is more than or equal to 5 mass % and less than or equal to 20 mass %, preferably more than or equal to 7 mass % and less than or equal to 18 mass %, more preferably more than or equal to 8 mass % and less than or equal to 16 mass %, and particularly preferably more than or equal to 9 mass % and less than or equal to 15 mass %, from the viewpoint of balance between good water resistance and dispersibility of the base metal pigment. If the sum of solvents having a specific dielectric constant of less than 30 is less than the above range, the dispersibility of the base metal pigment easily deteriorates, and if the sum of solvents having a specific dielectric constant of less than 30 exceeds the above range, the water resistance of the base metal pigment easily deteriorates.

When the total amount of the solvents used in the aqueous base metal pigment dispersion liquid according to the present embodiment is 100 mass %, the content ratio of water is preferably more than or equal to 20 mass %, more preferably more than or equal to 30 mass %, and particularly preferably more than or equal to 45 mass %.

In the aqueous base metal pigment dispersion liquid according to the present embodiment, the measured specific dielectric constant of the aqueous medium, from which the base metal pigment was removed by centrifugal separation, is preferably greater than or equal to 45 and less than or equal to 60, and more preferably greater than or equal to 50 and less than or equal to 58. When the aqueous medium having a specific dielectric constant within the above range is used as a dispersion medium, the water resistance and dispersibility of the base metal pigment surface-treated with the fluorine-based compound become further better. In addition, when the aqueous medium is a mixed solvent, generally, the specific dielectric constant of the mixed solvent has a value close to the weighted average of specific dielectric constant of each solvent, but frequently, may have a value distant from the weighted average value thereof due to other factors such as interaction between solvents, and the like.

The aqueous medium may also be added with a surfactant, a tertiary amine, a Ph adjuster, or the like.

Preferably, the surfactant that can be added to the aqueous medium is a fluorine-based surfactant and/or a silicone-based surfactant. The content of the surfactant in the aqueous medium is preferably less than or equal to 3 mass %, more preferably 0.01 mass % to 2 mass %, and particularly preferably 0.1 mass % to 1 mass %. When the content ratio of the surfactant is within the above range, the water resistance of the base metal pigment tends to be more improved. In addition, at the time of recording a metallic luster image, the surfactant functions as a slip agent, and is effective at improving the friction resistance of an image.

Examples of the fluorine-based surfactant include Megafac F-430, Megafac F-444, Megafac F-472SF, Megafac F-475, Megafac F-477, Megafac F-552, Megafac F-553, Megafac F-554, Megafac F-555, Megafac F-556, Megafac F-558, Megafac R-94, Megafac RS-75, and Megafac RS-72-K (all are trade names, manufactured by DIC Corporation); EFTOP EF-351, EFTOP EF-352, EFTOP EF-601, EFTOP EF-801, and EFTOP EF-802 (all are trade names, manufactured by Mitsubishi Materials Corporation); FTERGENT 222F, FTERGENT 251, and FTX-218 (all are trade names, manufactured by Neos Co., Ltd.); and Surflon SC-101 and Surflon KH-40 (all are trade names, manufactured by AGC Seimi Chemical Co., Ltd.).

Examples of the silicone-based surfactant include BYK-300, BYK-306, BYK-310, BYK-320, BYK-330, BYK-344, BYK-346, BYK-UV3500, and BYK-UV3570 (all are trade names, manufactured by BYK Japan K.K.); and KP-341, KP-358, KP-368, KF-96-50CS, and KF-50-100CS (all are trade names, manufactured by Shin-Etsu Chemical Co., Ltd.).

Examples of the tertiary amine that can be added to the aqueous medium include hydroxylamines, such as triethanolamine, tripropanolamine, tributanolamine, N, N-dimethyl-2-aminoethanol, and N,N-diethyl-2-aminoethanol. When the tertiary amine is added to the aqueous medium, there is a case that the dispersibility of the base metal pigment is improved by steric hindrance effects and pH adjustment action.

It is preferred that the pH adjuster that can be added to the aqueous medium have a buffering action capable of adjusting pH in a range of 4 to 10. In the pH range of 4 to 10, the zeta potential of the base metal pigment becomes negative, and thus the dispersibility of the base metal pigment is improved by the electrostatic repulsion between the base metal pigment particles. Examples of the pH adjuster having a buffering action include good buffers, such as 4-(2-hydroxyethyl)-1-piperazineethane sulfonic acid (HEPES), morpholinoethane sulfonic acid (MES), carbamoylmethyl-iminobis acetic acid (ADA), piperazine-1,4-bis(2-ethanesulfonic acid) (PIPES), N-(2-acetamido)-2-aminoethane sulfonic acid (ACES), colamine hydrochloride, N,N-bis(2-hydroxyethyl)-2-aminoethane sulfonic acid (BES), N-tris(hydroxymethyl)methyl-2-aminoethane sulfonic acid (TES), acetamide glycine, tricine, glycine amide, and bicine; a phosphate buffer; and a tris-buffer.

1.1.4. Method of Preparing Aqueous Base Metal Pigment Dispersion Liquid

The aqueous base metal pigment dispersion liquid according to the present embodiment can be prepared as follows.

First, a dispersion liquid, in which the above-mentioned mother particles are dispersed in a non-aqueous medium, is prepared. This dispersion liquid, if needed, is diluted with the same or different non-aqueous medium, and then the mother particles are pulverized by a stirrer such as a homogenizer such that the average particle diameter of the mother particles is less than or equal to 3 µm. The pulverization time is not particularly limited, but is generally 3 hours to 24 hours. Further, as the non-aqueous medium used in dilution, the same non-aqueous medium as the above-mentioned non-aqueous medium used in stripping and pulverizing is exemplified.

Subsequently, a fluorine-based compound is added to a dispersion liquid, in which the pulverized mother particles are dispersed in a non-aqueous medium, and then this dispersion liquid added with the fluorine-based compound is irradiated with ultrasonic waves to form a fluorine-based compound-coated film on the surface of the mother particles. In this way, a base metal pigment, in which the surface of the mother particles is treated with the fluorine-based compound, is obtained. The addition amount of the fluorine-based compound is 1 part by mass to 70 parts by mass, preferably 5 parts by mass to 40 parts by mass, and more preferably 15 parts by mass to 30 parts by mass, based on 100 parts by mass of the mother particles. Further, when surface treatment is conducted by ultrasonic irradiation, heating may be conducted. It is preferable that the heating temperature be higher than or equal to 40° C. Accordingly, it is presumed that the surface of the mother particles and the fluorine-based compound be covalently bonded to each other by the heat treatment, thereby enhancing the bonding force therebetween.

The surface treatment of the mother particles using the fluorine-based compound may be performed by directly treating the surface of the mother particles with the fluorine-based compound, but may also be performed by surface-treating the mother particles pretreated with acid or base using the fluorine-based compound. In this case, the chemical modification can be more definitely performed on the surface of the mother particles by the fluorine-based compound, and the above-mentioned effects of the invention can be more effectively realized. In addition, even when an oxide film is formed on the surface of particles to be the mother particles before the surface treatment of the mother particles using the fluorine-based compound, this oxide film can be removed, and the surface treatment of the mother particles using the fluorine-based compound can be performed in the state where the oxide film is removed, and thus the metallic luster of the manufactured base metal pigment can become more excellent. Examples of the acid used herein may include protonic acids, such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid. Meanwhile, examples of the base used herein may include sodium hydroxide, potassium hydroxide, and calcium hydroxide.

Subsequently, solvent substitution is performed. Specifically, a dispersion liquid, in which a base metal pigment is dispersed in a non-aqueous medium, is centrifugally separated to remove a supernatant liquid, the following aqueous medium previously prepared by mixing is added to this dispersion liquid in an adequate amount, and then the resulting dispersion liquid is irradiated with ultrasonic waves, thereby dispersing the base metal pigment in the aqueous medium. By the above process, the aqueous base metal pigment dispersion liquid according to the present embodiment is obtained. In addition, the aqueous base metal pigment dispersion liquid obtained in this way is also preferably heated. It is predicted that the fluorine-based compound ionically bonded to the surface of the mother particles is dehydrated by heating to form covalent bonds, and thus the mother particles and the fluorine-based compound are more strongly bonded to each other, thereby more effectively exhibiting the above-mentioned effects of the invention. The heating temperature is preferably higher than or equal to 50° C., and more preferably higher than or equal to 60° C. The heating time is preferably 1 day to 10 days.

1.1.4. Physical Properties of Aqueous Base Metal Pigment Dispersion Liquid

1.1.4.1. Shape

The base metal pigment contained in the aqueous base metal pigment dispersion liquid according to the present embodiment may have any shape, such as a sphere, a spindle, a needle, or the like, but, preferably, has a scale-like shape. When the base metal pigment has a scale-like shape, light reflectivity becomes better, and thus it is possible to record an image having excellent metallic luster.

In the invention, the scale-like shape, like a flat plate, a curved plate, or the like, is referred to as a shape whose area observed at a predetermined angle (observed by planar view) is larger than the area observed at an angle perpendicular to this observation direction. Particularly, the ratio $(S_1/S_0)$ of area $S_1$ µm$^2$ observed from a direction in which a projected area is the largest (observed by planar view) to area $S_0$ µm$^2$ observed from a direction in which an area observed from directions perpendicular to the observation direction is the largest is preferably greater than or equal to 2, more preferably greater than or equal to 5, and particularly preferably greater than or equal to 8. As this value, an average value of values obtained by observing arbitrary ten particles and calculating the area ratios of these particles may be employed.

1.1.4.2. Average Particle Diameter and Average Thickness

In the base metal pigment contained in the aqueous base metal pigment dispersion liquid according to the present embodiment, the average particle diameter thereof is preferably 0.25 µm to 3 µm, more preferably 0.25 µm to 1.5 µm, and particularly preferably greater than or equal to 0.3 µm and less than 0.1 µm. Further, in the base metal pigment contained in the aqueous base metal pigment dispersion liquid according to the present embodiment, the average thickness thereof is preferably 1 nm to 100 nm, and more preferably 10 nm to 70 nm. When the average particle diameter and average thickness of the base metal pigment are respectively within the above ranges, in the case where this base metal pigment is applied to an aqueous ink composition, the flatness and smoothness of a coating film become excellent, and thus it is possible to record an image having excellent metallic luster. Furthermore, it is possible to manufacture a pigment dispersion liquid in a high production yield and to prevent the base metal pigment from being involuntarily deformed in the preparation of the aqueous ink composition.

This average particle diameter is represented by a 50% average particle diameter (R50) of circle-equivalent diameters obtained from the area of a projected image of the base metal pigment, in which projected image is obtained by a particle image analyzer. The "circle-equivalent diameter"

means the diameter of a circle when the circle is assumed to have the same area as the area of the projected image of the base metal pigment, in which the projected image is obtained using a particle image analyzer. For example, when the projected image of the base metal pigment has a polygonal shape, the diameter of this circle obtained by converting this projected image into a circle is referred to as the circle-equivalent diameter of this base metal pigment.

The area and circle-equivalent diameter of the projected image of the base metal pigment can be measured using a particle image analyzer. Examples of this particle image analyzer include flow-type particle image analyzers FPIA-2100, FPIA-3000, and FPIA-3000S (all are trade names, manufactured by Sysmex Corporation). The average particle diameter of the circle-equivalent diameter is a particle diameter based on number. As the measuring method using FPIA-3000 or FPIA-3000S, a measuring method operated in a HPF measurement mode using a high-power imaging unit is exemplified.

Meanwhile, the average thickness is obtained by photographing a lateral image of a base metal pigment using a transmission electron microscope (TEM) or a scanning electron microscope (SEM), respectively measuring the thicknesses of ten base metal pigments and then averaging these thicknesses. As the transmission electron microscope (TEM), "JEM-2000EX", manufactured by JEOL Ltd., is exemplified, and as the scanning electron microscope (SEM), "S-4700", manufactured by Hitachi High-Technologies Corporation, is exemplified.

2. AQUEOUS INK COMPOSITION

The aqueous ink composition according to the present embodiment includes: a base metal pigment surface-treated with a fluorine-based compound; and water as a part of a solvent, in which the aqueous ink composition further includes one or more solvents having a specific dielectric constant of greater than or equal to 30 and less than or equal to 50 and one or more solvents having a specific dielectric constant of less than 30, as measured by an alternate current-type dielectric constant measurement device at a temperature of 23° C. and a frequency of 10 kHz, as the solvent, and in which the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %, when the total amount of the solvents is 100 mass %.

Descriptions of the mother particle or fluorine-based compound constituting the base metal pigment and the shape, average particle diameter, average thickness, manufacturing method, aqueous medium, and additive of the base metal pigment will be omitted because they are the same as those of the above-mentioned aqueous base metal pigment dispersion liquid.

According to the aqueous ink composition of the present embodiment, an aqueous medium mixed with a solvent having a predetermined specific dielectric constant is used, and thereby the water resistance and dispersibility of the base metal pigment surface-treated with a fluorine-based compound become better. In the aqueous ink composition according to the present embodiment, since the dispersibility of the base metal pigment is excellent, the clogging of a nozzle due to the agglomeration of the base metal pigment particles is suppressed even when this aqueous ink composition is applied to an ink jet printer. For this reason, the discharge stability of ink becomes better. In addition, since surface free energy can be lowered by the effect of fluorine in the fluorine-based compound bonded to the surface of the base metal pigment, the base metal pigment is easily leafed at the time of drying ink, and it is possible to record an image having excellent metallic luster.

In the invention, the "aqueous ink composition" is referred to as an ink composition including water in an amount of more than or equal to 30 mass %, preferably more than or equal to 40 mass %, and more preferably more than or equal to 50 mass %, based on 100 mass % of the total amount of a solvent. It is preferred that pure water or ultrapure water such as ion-exchanged water, ultrafiltered water, reverse osmotic water, or distilled water be used as the water. In particular, water obtained by sterilizing the above-mentioned water by ultraviolet irradiation or by the addition of hydrogen peroxide is preferably used because it can suppress the generation of fungi or bacteria over a long period of time.

The concentration of the base metal pigment in the aqueous ink composition according to the present embodiment is preferably 0.1 mass % to 5.0 mass %, more preferably 0.25 mass % to 3.0 mass %, and particularly preferably 0.5 mass % to 2.5 mass %, based on the total mass of the aqueous ink composition.

If necessary, resins, a surfactant, alkanediol, polyhydric alcohol, a pH adjuster, or the like may be added to the aqueous ink composition according to the present embodiment.

Resins have a function of strongly attaching a base metal pigment onto a recording medium. Examples of the resins include homopolymers or copolymers of acrylic acid, acrylic acid esters, methacrylic acid, methacrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride; urethane resins; fluorine resins; and natural resins. As the copolymer, any one of a random copolymer, a block copolymer, an alternate copolymer, and a graft copolymer may be used.

It is preferable that the surfactant include an acetylene glycol-based surfactant, a polysiloxane-based surfactant, and a fluorine-based surfactant. These acetylene glycol-based surfactant, polysiloxane-based surfactant, and fluorine-based surfactant can increase the permeability of an ink by increasing the wettability into the recording surface of a recording medium. Examples of the acetylene glycol-based surfactant include 2,4,7,9-tetramethyl-5-desine-4,7-diol, 3,6-dimethyl-4-octine-3,6-diol, 3,5-dimethyl-1-hexyne-3-ol, and 2,4-dimethyl-5-hexyne-3-ol. Further, as the acetylene glycol-based surfactant, commercially available products thereof may be used, and examples thereof include OLFINE E1010, STG, Y (all are trade names, manufactured by Nissin Chemical Co., Ltd.), Surfynol 104, 82, 465, 485, TG (all are trade names, manufactured by Air Products and Chemicals, Inc.). As the polysiloxane-based surfactant, commercially available products thereof may be used, and examples thereof include BYK-347, and BYK-348 (all are trade names, manufactured by BYK Japan K.K.). Examples of the fluorine-based surfactant include Megafac F-430, Megafac F-444, Megafac F-472SF, Megafac F-475, Megafac F-477, Megafac F-552, Megafac F-553, Megafac F-554, Megafac F-555, Megafac F-556, Megafac F-558, Megafac R-94, Megafac RS-75, and Megafac RS-72-K (all are trade names, manufactured by DIC Corporation); EFTOP EF-351, EFTOP EF-352, EFTOP EF-601, EFTOP EF-801, and EFTOP EF-802 (all are trade names, manufactured by Mitsubishi Materials Corporation); FTERGENT 222F, FTERGENT 251, and FTX-218 (all are trade names, manufactured by Neos Co., Ltd.); and Surflon SC-101, and Surflon KH-40 (all are trade names, manufactured by AGC Seimi Chemical Co., Ltd.). Meanwhile, other surfactants, such as an anionic surfactant, a nonionic surfactant, and an amphoteric surfactant, may be added to the aqueous ink composition.

The alkanediol can increase the permeability of an ink by increasing the wettability into the recording surface of a recording medium. Preferably, the alkanediol is 1,2-alkanediol having a carbon number of greater than or equal to 4 and less than or equal to 8, such as 1,2-butanediol, 1,2-pentanediol, 1,2-hexanediol, 1,2-heptanediol, 1,2-octanediol, or the like. Among these, 1,2-hexanediol, 1,2-heptanediol, and 1,2-octanediol, each having a carbon number of greater than or equal to 6 and less than or equal to 8, are more preferable because their permeability into a recording medium is very high.

The polyhydric alcohol can suppress the drying of an aqueous ink composition when the aqueous ink composition is applied to an ink jet recording apparatus, thereby preventing the clogging of the aqueous ink composition in a head portion of the ink jet recording apparatus. Examples of the polyhydric alcohol include ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylol ethane, and trimethylol propane.

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

The aqueous ink composition according to the present embodiment may further contain additives, such as a fixing agent of water-soluble rosin or the like, an antifungal agent or antiseptic agent of sodium benzoate or the like, an antioxidant or ultraviolet absorber of allophanates or the like, a chelating agent, and an oxygen absorber. These additives may be used alone or in a combination of two or more thereof.

Meanwhile, it is preferable that the aqueous ink composition according to the present embodiment not substantially contain a polymerizable compound. The sentence "a polymerizable compound is not substantially contained" means that the polymerizable compound is not intentionally added to the aqueous ink composition, and that the polymerizable compound may be contained such that it is previously contained in the additive added at the time of adjusting the aqueous ink composition. Accordingly, there is a case that the metallic luster of a recorded image becomes better. In contrast, when the aqueous ink composition contains a polymerizable compound, there are problems that the stability (preservation stability) of the composition becomes inferior, and the discharge stability of the composition is deteriorated due to a viscosity increase attributable to gelation.

This polymerizable compound includes a radical polymerizable compound and a cationic polymerizable compound. Examples of the radical polymerizable compound include an allyl compound, and more preferably an allyl ether compound, ethylene glycerin monoallyl ether, trimethylolpropane diallyl ether, trimethylolpropane monoallyl ether, glycerol monoallyl ether, allyl glycidyl ether, pentaerythritol triallyl ether, (meth)acrylic acid, a (meth)acrylic acid compound, and a vinyl compound. Examples of the cationic polymerizable compound include an epoxy compound, a vinyl ether compound, and an oxetane compound, which are disclosed in JP-A-6-9714, JP-A-2001-310937, and JP-A-2001-220526, respectively.

The aqueous ink composition according to the present embodiment, the use thereof not being particularly limited, can be applied to writing materials, stamps, recorders, pen plotters, ink jet recording apparatuses, and the like.

The viscosity of the aqueous ink composition according to the present embodiment at 20° C. is preferably greater than or equal to 2 mPa·s and less than or equal to 10 mPa·s, more preferably greater than or equal to 3 mPa·s and less than or equal to 5 mPa·s. When the viscosity of the aqueous ink composition at 20° C. is within the above range, the aqueous ink composition is discharged from a nozzle in an adequate amount, and the curved flight and scattering of the aqueous ink composition can be further suppressed, and therefore this aqueous ink composition can be suitably used in an ink jet recording apparatus.

3. EXAMPLES

Hereinafter, the invention will be described in detail based on the following Examples, but is not limited to these Examples. The "part" and "%" in Examples and Comparative Examples are mass standards unless otherwise specified.

3.1. Experimental Examples 1 to 8

Single Solvent System 3.1.1. Preparation of Aluminum Particle Dispersion Liquid

First, a polyethylene terephthalate-made film having a flat and smooth surface (surface roughness Ra: less than or equal to 0.02 μm) was prepared.

Subsequently, the entire one side of this film is coated with silicone oil. A film made of aluminum (hereinafter, simply referred to as "an aluminum film") was formed on the surface side coated with this silicone oil using an evaporation method.

Subsequently, the film provided with the aluminum film was immersed in diethylene glycol diethyl ether, and was irradiated with ultrasonic waves to strip and pulverize the aluminum film from the film. Subsequently, this aluminum film was put into a homogenizer, and was pulverized for about 8 hours to obtain a dispersion liquid of scale-like aluminum particles (mother particles). The concentration of aluminum particles in this dispersion liquid was 10 mass %.

100 parts by mass of diethylene glycol diethyl ether was added to 100 parts by mass of the dispersion liquid containing the aluminum particles obtained in this way to adjust the concentration of aluminum particles to 5 mass %, and then 50 parts by mass of 2-(perfluorohexyl)ethylphosphonic acid was added to 100 parts by mass of the aluminum particles, and these aluminum particles were surface-treated while performing ultrasonic irradiation at a liquid temperature of 55° C. for 3 hours. Thereafter, the surface-treated aluminum particles were centrifugally precipitated by a centrifugal separator (10000 rpm×30 min), its supernatant portion was discarded, the solvent given in Table 1 was added thereto, and then these surface-treated aluminum particles was re-dispersed by ultrasonic irradiation to obtain a dispersion liquid containing aluminum particles in an amount of 1.7 mass %.

In this dispersion liquid, the average particle diameter of aluminum particles was 0.8 μm, and the average thickness thereof was 10 nm.

(model number: LCWP04700), manufactured by MILI-PORE Corporation). Evaluation criteria of dispersibility are as follows. The results of dispersibility evaluation test are given in Table 1.

A: Filter passing amount is more than or equal to 100 cc.

B: Filter passing amount is more than or equal to 10 cc and less than 100 cc.

C: Filter passing amount is more than or equal to 5 cc and less than 10 cc.

D: Filter passing amount is more than or equal to 1 cc and less than 5 cc.

E: Filter passing amount is less than 1 cc.

3.1.4. Evaluation Results

Table 1 shows the results of evaluation tests in Experimental Examples 1 to 8. In Table 1, the numerical value listed in each Experimental Example indicates "mass %", and the symbol "–" listed therein indicates non-addition.

TABLE 1

| Kind of solvent | Specific dielectric constant | Exp. Ex. 1 | Exp. Ex. 2 | Exp. Ex. 3 | Exp. Ex. 4 | Exp. Ex. 5 | Exp. Ex. 6 | Exp. Ex. 7 | Exp. Ex. 8 |
|---|---|---|---|---|---|---|---|---|---|
| Water | 74.1 | 100 | — | — | — | — | — | — | — |
| Glycerin | 46.7 | — | 100 | — | — | — | — | — | — |
| Propylene glycol | 36.1 | — | — | 100 | — | — | — | — | — |
| 2-pyrrolidone | 26.4 | — | — | — | 100 | — | — | — | — |
| Hexylene glycol | 23.7 | — | — | — | — | 100 | — | — | — |
| 1,2-hexanediol | 13.8 | — | — | — | — | — | 100 | — | — |
| Diethylene glycol diethyl ether | 5.4 | — | — | — | — | — | — | 100 | — |
| Triethylene glycol | 24.9 | — | — | — | — | — | — | — | 100 |
| Specific dielectric constant | | 74.1 | 46.7 | 36.1 | 26.4 | 23.7 | 13.8 | 5.4 | 24.9 |
| dispersibility | | E | D | D | C | A | A | A | A |

3.1.2. Measurement of Specific Dielectric Constant

The specific dielectric constant of each of the solvents given in Table 1 was measured at 23° C. by a parallel-plate capacitor method using an alternate current-type dielectric constant measurement device (device name "ARES-K2", manufactured by TA Instruments Japan, Inc.). Specifically, under an environment of 23° C., the solvent, as a sample, was pinched between two parallelly-arranged electrode plates (stainless plate having a diameter of 25 mm ϕ) (gap between electrode plates: 0.5 mm) to form a capacitor, and then an alternate current of 1 V was applied to the capacitor at a frequency of 10 kHz to 100 kHz to measure the specific dielectric constant thereof, thereby obtaining the specific dielectric constant at the time of applying the alternate current at a frequency of 10 kHz. The measurement results of specific dielectric constant of each of the solvents are given in Table 1.

3.1.3. Evaluation Test

Dispersibility Evaluation Test

Dispersibility was evaluated depending on how much the above obtained aluminum particle dispersion liquid passes through a 10 μm filter (MITEX MEMBRANE FILTERS According to the evaluation results of Table 1, when a solvent having a specific dielectric constant of greater than or equal to 30 was used alone as a dispersion medium, a tendency of dispersibility to deteriorate was recognized. In particular, when water was used alone, it was found that dispersibility greatly deteriorates. Meanwhile, when a solvent having a specific dielectric constant of less than 30 was used alone as a dispersion medium, a tendency of dispersibility to become good was recognized.

3.2. Experimental Examples 9 to 22

Mixed Solvent System

3.2.1. Preparation of Aluminum Particle Dispersion Liquid

Each of aluminum particle dispersion liquids was prepared in the same manner as the above-mentioned "3.1.1 preparation of aluminum particle dispersion liquid", except that the aqueous medium (mixed solvent) given in Table 2 was used at the time of solvent substitution.

3.2.2. Measurement of Specific Dielectric Constant

The specific dielectric constant of the aqueous medium (mixed solvent) given in Table 2 was measured in the same manner as the above-mentioned "3.1.2 measurement of specific dielectric constant". The results of measurement of specific dielectric constant of each aqueous medium (mixed solvent) are given in Table 2.

3.2.3. Evaluation Test

Dispersibility Evaluation Test

The dispersibility of aluminum particle dispersion liquid was evaluated in the same manner as described above. The results of dispersibility evaluation test are given in Table 2.

Water Resistance Evaluation Test 10 cc of the above obtained aluminum particle dispersion liquid was hermetically contained in an aluminum pack. This aluminum pack was stored at a constant temperature of 70° C. for 6 days. Gas yield after the storage was measured by Archimedes' method. Further, the appearance of the dispersion liquid after storage at 70° C. for 6 days was visually observed. Evaluation criteria of water resistance are as follows. The results of water resistance evaluation test are given in Table 2.

A: Gas yield is less than 0.5 cc/g (dispersion liquid), and appearance does not change.
B: Gas yield is more than or equal to 0.5 cc/g (dispersion liquid) and less than 1 cc/g (dispersion liquid), and appearance does not change.
C: Gas yield is more than or equal to 1 cc/g (dispersion liquid), and whitening caused by the formation of $Al(OH)_3$ occurs.

3.2.4. Evaluation Results

Table 2 shows the results of evaluation tests in Experimental Examples 9 to 22. In Table 2, the numerical value listed in each Experimental Example indicates "mass %", and the symbol "–" listed therein indicates non-addition.

According to the evaluation results of Table 2, when the specific dielectric constant of an aqueous medium (mixed solvent) was more than 60, a tendency of dispersibility to deteriorate was recognized. In contrast, when the specific dielectric constant of the aqueous medium (mixed solvent) was less than 45, a tendency of water resistance to deteriorate was recognized.

3.3. Examples 1 to 11 and Comparative Examples 1 to 4

Aqueous Ink Composition

3.3.1. Preparation of Aqueous Ink Composition

Each of aqueous ink compositions was prepared in the same manner as the above-mentioned "3.1.1 preparation of aluminum particle dispersion liquid", except that the aqueous medium (mixed solvent) given in Table 3 was used at the time of solvent substitution.

3.3.2. Measurement of Specific Dielectric Constant

The specific dielectric constant of the aqueous medium (mixed solvent) given in Table 3 was measured in the same manner as the above-mentioned "3.1.2 measurement of specific dielectric constant", except that the above obtained aqueous ink composition was centrifugally separated (3000 rpm for 10 min) to precipitate aluminum particles, and then the resulting supernatant liquid was used as a sample. The results of measurement of specific dielectric constant of each aqueous medium (mixed solvent) are given in Table 3.

TABLE 2

| Kind of solvent | Specific dielectric constant | Exp. Ex. 9 | Exp. Ex. 10 | Exp. Ex. 11 | Exp. Ex. 12 | Exp. Ex. 13 | Exp. Ex. 14 | Exp. Ex. 15 |
|---|---|---|---|---|---|---|---|---|
| Glycerin | 46.7 | 50 | — | — | — | — | — | — |
| Propylene glycol | 36.1 | — | 50 | — | — | — | — | — |
| 2-pyrrolidone | 26.4 | — | — | 50 | — | — | — | — |
| Hexylene glycol | 23.7 | — | — | — | 50 | — | — | — |
| 1,2-hexanediol | 13.8 | — | — | — | — | 50 | — | — |
| Diethylene glycol diehyl ether | 5.4 | — | — | — | — | — | 50 | — |
| Triethylene glycol | 24.9 | — | — | — | — | — | — | 50 |
| Water | 74.1 | 50 | 50 | 50 | 50 | 50 | 50 | 50 |
| Specific dielectric constant | | 56.5 | 50.7 | 62.2 | 46.5 | 35.5 | 34.5 | 48.9 |
| Dispersibility | | E | E | D | B | A | A | B |
| Water resistance | | A | A | A | B | C | C | B |

| Kind of solvent | Specific dielectric constant | Exp. Ex. 16 | Exp. Ex. 17 | Exp. Ex. 18 | Exp. Ex. 19 | Exp. Ex. 20 | Exp. Ex. 21 | Exp. Ex. 22 |
|---|---|---|---|---|---|---|---|---|
| Glycerin | 46.7 | 10 | — | — | — | — | — | — |
| Propylene glycol | 36.1 | — | 10 | — | — | — | — | — |
| 2-pyrrolidone | 26.4 | — | — | 10 | — | — | — | — |
| Hexylene glycol | 23.7 | — | — | — | 10 | — | — | — |
| 1,2-hexanediol | 13.8 | — | — | — | — | 10 | — | — |
| Diethylene glycol diehyl ether | 5.4 | — | — | — | — | — | 10 | — |
| Triethylene glycol | 24.9 | — | — | — | — | — | — | 10 |
| Water | 74.1 | 90 | 90 | 90 | 90 | 90 | 90 | 90 |
| Specific dielectric constant | | 72.1 | 69.5 | 72.3 | 67.8 | 64.0 | 63.3 | 69.1 |
| Dispersibility | | E | E | E | D | C | C | D |
| Water resistance | | A | A | A | A | A | A | A |

3.3.3. Evaluation Test

Dispersibility Evaluation Test

The dispersibility of each aqueous ink composition was evaluated in the same manner as described above. The results of dispersibility evaluation test are given in Table 3.

Water Resistance Evaluation Test

The water resistance of each aqueous ink composition was evaluated in the same manner as described above. The results of water resistance evaluation test are given in Table 3.

3.3.4. Evaluation Results

Table 3 shows the results of evaluation tests in Examples 1 to 11 and Comparative Examples 1 to 4. The "Megafac F-553" in Table 3 is a trade name of a fluorine-based surfactant (fluorine group-containing, hydrophilic group-containing or lipophilic group-containing oligomer) manufactured by DIC Corporation. In Table 3, the numerical value listed in each Example and each Comparative Example indicates "mass %", and the symbol "–" listed therein indicates non-addition.

particles surface-treated with the fluorine-based compound to become better was recognized.

The invention can be variously modified without being limited to the above-mentioned embodiments. For example, the invention includes substantially the same configurations as those described in the embodiments (for example, configurations having the same function, method, and result or configurations having the same object and effect). The invention includes configurations that replace non-essential parts of the configurations described in the embodiments. The invention includes configurations that can achieve the same action and effect as those described in the embodiments or the same purpose as the configurations described in the embodiments. The invention includes configurations obtained by applying known technologies to the configurations described in the embodiments.

The entire disclosure of Japanese Patent Application No. 2014-000219, filed Jan. 6, 2014 is expressly incorporated by reference herein.

What is claimed is:

1. An aqueous base metal pigment dispersion liquid, comprising:
   a base metal pigment surface-treated with a fluorine-based compound; and

TABLE 3

| Components of aqueous ink composition | Specific dielectric constant | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Glycerin | 46.7 | — | — | — | — | — | — | — | 21 | — |
| Propylene glycol | 36.1 | 35 | 28 | 21 | 21 | 35 | 35 | 35 | — | 35 |
| 2-pyrrolidone | 26.4 | — | — | — | — | — | — | — | — | — |
| Hexylene glycol | 23.7 | 15 | 12 | 9 | 9 | 15 | 15 | 15 | — | — |
| 1,2-hexanediol | 13.8 | — | — | — | — | — | — | — | 9 | — |
| Diethylene glycol diethyl ether | 5.4 | — | — | — | — | — | — | — | — | — |
| Triethylene glycol | 24.9 | — | — | — | — | — | — | — | — | 15 |
| Megafac F-553 | — | — | — | — | — | — | 0.35 | 0.35 | 0.35 | 0.35 |
| Triethanolamine | 30.5 | — | — | — | — | 0.15 | — | 0.15 | 0.15 | 0.15 |
| Water | 74.1 | 50 | 50 | 70 | 61 | 49.85 | 49.65 | 49.5 | 69.5 | 49.5 |
| Specific dielectric constant | | 49.2 | 55.8 | 61.1 | 57.0 | 52.7 | 50.3 | 51.0 | 61.5 | 52.7 |
| Dispersibility | | B | B | B | B | B | A | A | A | A |
| Water resistance | | A | A | A | A | A | A | A | A | A |

| Components of aqueous ink composition | Specific dielectric constant | Ex. 10 | Ex. 11 | Comp. Ex. 1 | Comp. Ex. 2 | Comp. Ex. 3 | Comp. Ex. 4 |
|---|---|---|---|---|---|---|---|
| Glycerin | 46.7 | — | — | — | — | — | — |
| Propylene glycol | 36.1 | 21 | 21 | 4 | 21 | 55 | 55 |
| 2-pyrrolidone | 26.4 | — | 9 | — | — | — | — |
| Hexylene glycol | 23.7 | — | 9 | 4 | — | 25 | 3 |
| 1,2-hexanediol | 13.8 | — | — | — | 3 | — | — |
| Diethylene glycol diethyl ether | 5.4 | 9 | — | — | — | — | — |
| Triethylene glycol | 24.9 | — | — | — | — | — | — |
| Megafac F-553 | — | 0.35 | 0.35 | 0.35 | 0.35 | 0.35 | 0.35 |
| Triethanolamine | 30.5 | 0.15 | 0.015 | 0.15 | 0.15 | 0.15 | 0.15 |
| Water | 74.1 | 69.5 | 60.635 | 91.5 | 75.5 | 19.5 | 41.5 |
| Specific dielectric constant | | 58.5 | 56.7 | 70.1 | 65.2 | 41.1 | 49.1 |
| Dispersibility | | A | A | D | C | A | D |
| Water resistance | | B | A | A | A | C | A |

According to the evaluation results of Table 3, when the aqueous medium, in which the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %, was used, a tendency of the balance between both dispersibility and water resistance of the aluminum water as a part of a solvent,
wherein the aqueous base metal pigment dispersion liquid further comprises one or more solvents having a specific dielectric constant of greater than or equal to 30 and less than or equal to 50 and one or more solvents having a specific dielectric constant of less than 30, as measured by an alternate current-type dielectric constant measurement device at a temperature of 23° C. and a frequency of 10 kHz, as the solvent, and wherein the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %, when the total amount of the solvents is 100 mass %, and wherein a molecular weight of the fluorine-based compound is less than or equal to 1000.

2. The aqueous base metal pigment dispersion liquid according to claim 1,
wherein a solvent, from which the base metal pigment was removed by centrifugal separation, has a specific dielectric constant of greater than or equal to 45 and less than or equal to 60, as measured by an alternate current-type dielectric constant measurement device, at a temperature of 23° C. and a frequency of 10 kHz.

3. The aqueous base metal pigment dispersion liquid according to claim 1,
wherein the base metal pigment has a scale-like shape.

4. The aqueous base metal pigment dispersion liquid according to claim 1,
wherein the fluorine-based compound has a perfluoroalkyl group.

5. The aqueous base metal pigment dispersion liquid according to claim 4,
wherein the perfluoroalkyl group has a carbon number of 1 to 6.

6. An aqueous ink composition, comprising:
a base metal pigment surface-treated with a fluorine-based compound; and
water as a part of a solvent,
wherein the aqueous ink composition further comprises one or more solvents having a specific dielectric constant of greater than or equal to 30 and less than or equal to 50 and one or more solvents having a specific dielectric constant of less than 30, as measured by an alternate current-type dielectric constant measurement device at a temperature of 23° C. and a frequency of 10 kHz, as the solvent, as the solvent, and wherein the sum of the solvents having a specific dielectric constant of greater than or equal to 30 and less than or equal to 50 is more than or equal to 5 mass % and less than or equal to 50 mass % and the sum of the solvents having a specific dielectric constant of less than 30 is more than or equal to 5 mass % and less than or equal to 20 mass %, when the total amount of the solvents is 100 mass %, and wherein a molecular weight of the fluorine-based compound is less than or equal to 1000.

7. The aqueous ink composition according to claim 6,
wherein a solvent, from which the base metal pigment was removed by centrifugal separation, has a specific dielectric constant of greater than or equal to 45 and less than or equal to 60, as measured by an alternate current-type dielectric constant measurement device at a temperature of 23° C. and a frequency of 10 kHz.

8. The aqueous ink composition according to claim 6,
wherein the base metal pigment has a scale-like shape.

9. The aqueous ink composition according to claim 6,
wherein the fluorine-based compound has a perfluoroalkyl group.

10. The aqueous ink composition according to claim 9,
wherein the perfluoroalkyl group has a carbon number of 1 to 6.

11. The aqueous ink composition according to claim 6,
wherein the aqueous ink composition does not substantially contain a polymerizable compound.

* * * * *